United States Patent [19]
David et al.

[11] 3,797,275
[45] Mar. 19, 1974

[54] CONTROLLED-MOTOR PIVOTING COUPLING DEVICES

[75] Inventors: Pierre Yvon David; Joel M. Charles, both of La Valette; Robert Julien Toscano, La Seyne Sur Mer, all of France

[73] Assignee: Etat Francais represente par le Ministre d'Etat charge de la Defense Nationale-Delegation Ministerielle pour l'Armement, Paris, France

[22] Filed: Aug. 8, 1972

[21] Appl. No.: 278,798

[52] U.S. Cl.............................. 64/17 R, 64/6, 74/661
[51] Int. Cl............................................... F16d 3/26
[58] Field of Search........ 64/17 R, 17 SP, 17 A, 18, 64/6; 287/1; 74/661; 244/12 A

[56] References Cited
UNITED STATES PATENTS
2,938,459  5/1960  McGraw et al. ............................ 64/6
3,065,612  11/1962  Tiffin et al. ............................ 64/17 R
3,073,630  1/1963  Kuhn .................................. 64/17 A
3,456,458  7/1969  Dixon .................................... 64/18

Primary Examiner—Samuel Scott
Assistant Examiner—Randall Heald
Attorney, Agent, or Firm—Eric H. Waters

[57] ABSTRACT

A device for allowing a part to be coupled to a support with means for controlling pivotal movements around three perpendicular axes. The device includes an appliance suspended on the arm of a hoisting apparatus by means of a coupling device comprising a bearing extended by a fork carrying two hydraulic motor brakes. A cardan sprocket rotates the fork around the x-x' axis and is firmly connected with the shafts of the motors. The sprocket carries a further hydraulic motor-brake on a shaft to which is attached a shaft pivotable relative to said the sprocket around the y-y' axis. A support is integral with the latter shaft and it contains a further or motor brake on which is suspended an appliance pivotable around the vertical axis Z-Z'.

5 Claims, 3 Drawing Figures

CONTROLLED-MOTOR PIVOTING COUPLING DEVICES

FIELD OF INVENTION

The present invention relates to devices for the mechanical intercoupling of two moving parts so that they may pivot under control in relation to each other around at least two perpendicular axes.

BACKGROUND

Universal joints are ordinarily used to intercouple two rotating shafts. They can also be used for connecting a part to a fixed bearing so that the moving part may slew freely while pivoting around two perpendicular axes.

SUMMARY OF INVENTION

One of the objects of the present invention is to provide a mechanical coupling device having a universal joint wherein the rotations of the cardan cross instead of being free are constrained by cardan-shaft brakes allowing the slewing of one of the portions of the coupling to be varied in relation to the other portion, or to dampen or check the rotations.

The universal-joint coupling device by controlled motion can be still further improved by the addition of a controlled means for pivoting around a third axis perpendicular to the two axes of the above universal joint thus resulting in a coupling which allows control of the movements in all directions.

One specific but non-exclusive embodiment of a coupling according to the invention is a suspension for a lifting device on hoisting apparatus such as, for example, the suspension of an articulated-finger clamp on the arm of a mechanical shovel or the suspension of a bucket grip on a crane jib or derrick, using neither cable nor hook and enabling the machine operator to control the slewing movements of the device and of the load without changing the position of the main apparatus or the arm of said apparatus.

Such suspension is particularly applicable to open-sea handling where the hoisting gear and the load are subject to a relatively low-amplitude oscillating motion. For example, if a drifting boat is to be hoisted aboard a ship, half-deck or pontoon, the hoisting apparatus remains substantially steady while the load follows the motion of the swell. Hitherto, the necessitated grappling the load by means of a hook hung on a cable, which was a very inconvenient way of doing the job.

The coupling according to the present invention can be used in a device which is the subject of copending U.S. Pat. application Ser. No. 278,797, filed Aug. 8, 1972 for suspending a clamp on a lifting arm for effecting the hoisting of small boats or other drifting objects.

This device allows the clamp to follow the movements of the load at the instant of hookup, the operator can then brake and dampen the oscillations of the load by operating on the controllable coupling. The operator can also slew the load before depositing it.

This use is given only by way of illustration and is clearly non-limitative.

The coupling of the invention can also act for fixing a pod or working platform to the end of an arm with means for slewing said pod along two perpendicular axes.

One result of the invention is the provision of various novel products composed of a universal coupling or couplings with three concurrent degrees of freedom along three perpendicular axes, the movements of which are controllable either for direction or braking.

Another result of the invention is the provision of a device for the suspension of an appliance on the arm of a hoisting apparatus comprising, between the appliance and the arm, a mechanical coupling which allows concurrent rotations along three perpendicular axes, one of these being the vertical axis of the appliance.

The cardan brakes are preferably hydraulic engines supplied through flexible hoses following the movements. Obviously, this feature is not limitative and pneumatic motors or electromagnetic cardan brakes can be substituted for the said engines.

BRIEF DESCRIPTION OF THE DRAWING

The various characteristics and advantages of the invention will be best understood from the following description of a preferred embodiment given by way of non-limitative example and with reference to the attached drawings in which.

DETAILED DESCRIPTION

Figure 1:
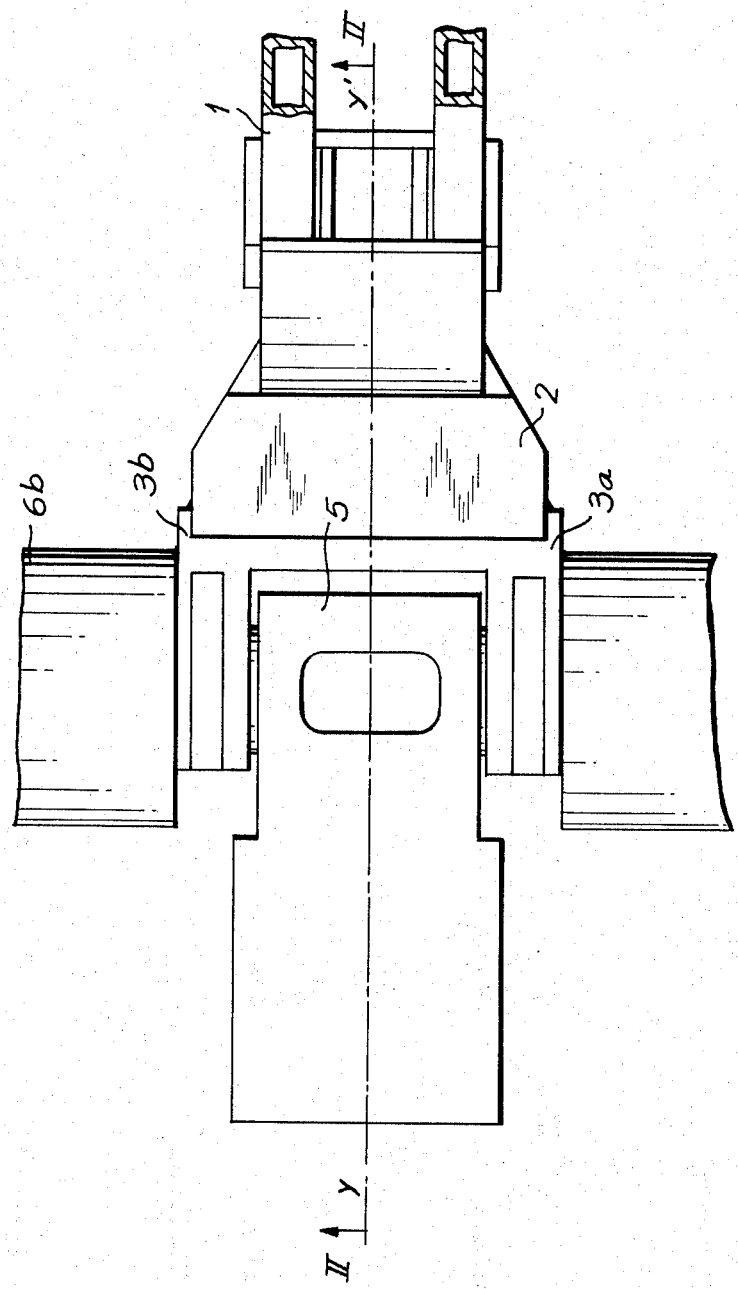
FIG. 1 is a view from below of a device for the suspension of an appliance from the arm of a hoisting apparatus.
Figure 2:
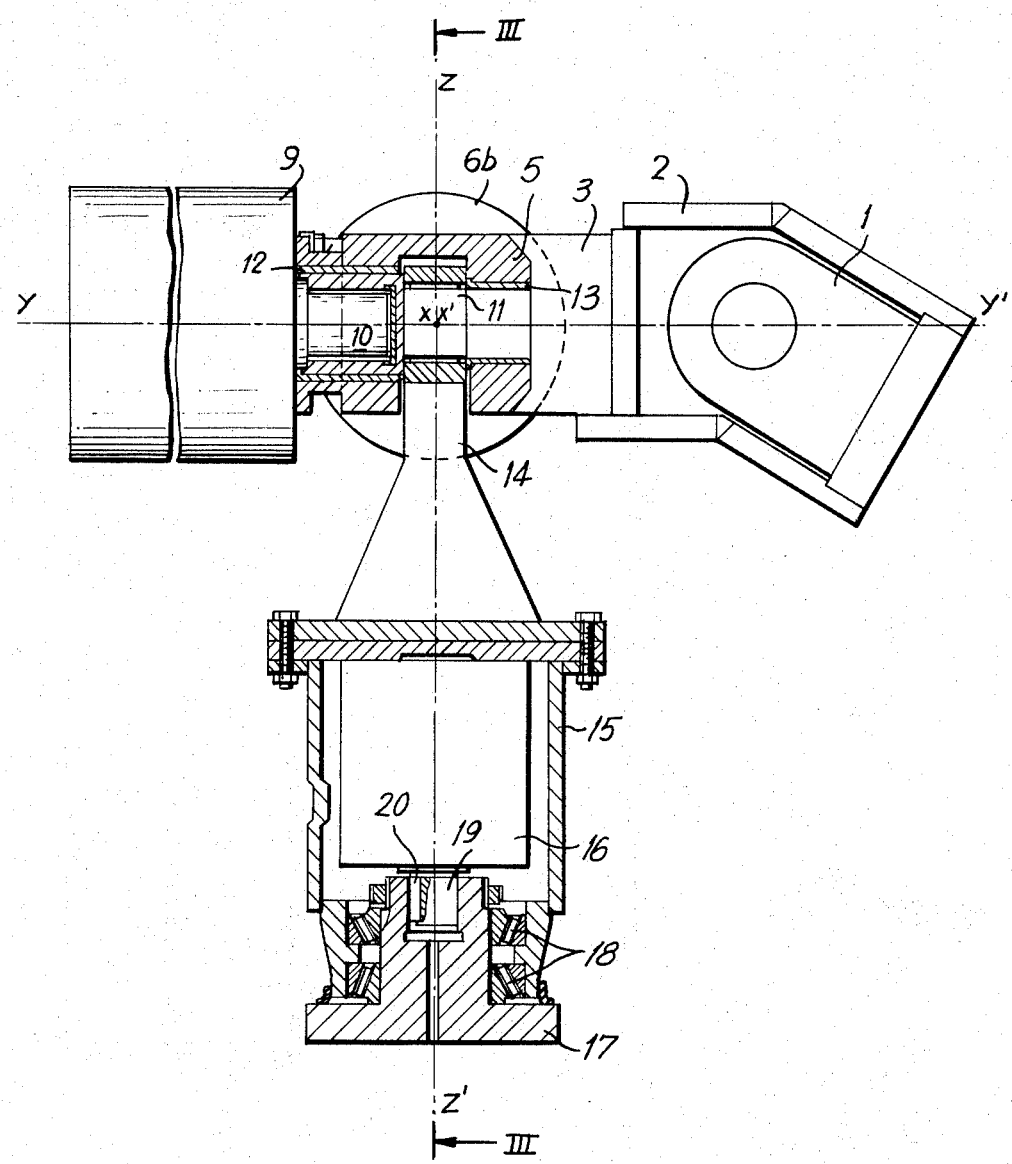
FIG. 2 is a partial sectional view along line II — II of FIG. 1.

FIG. 2 is a vertical view illustrating the end of an arm 1 of a hoisting apparatus such as, for example, the arm end of a mechanical shovel.

An appliance, such as a clamp for grappling and raising loads, is hung on that arm. The appliance comprises a bearing 2 which is fixed firmly to arm 1 such as, for example, by telescoping it around that end and keying it on.

Figure 3:
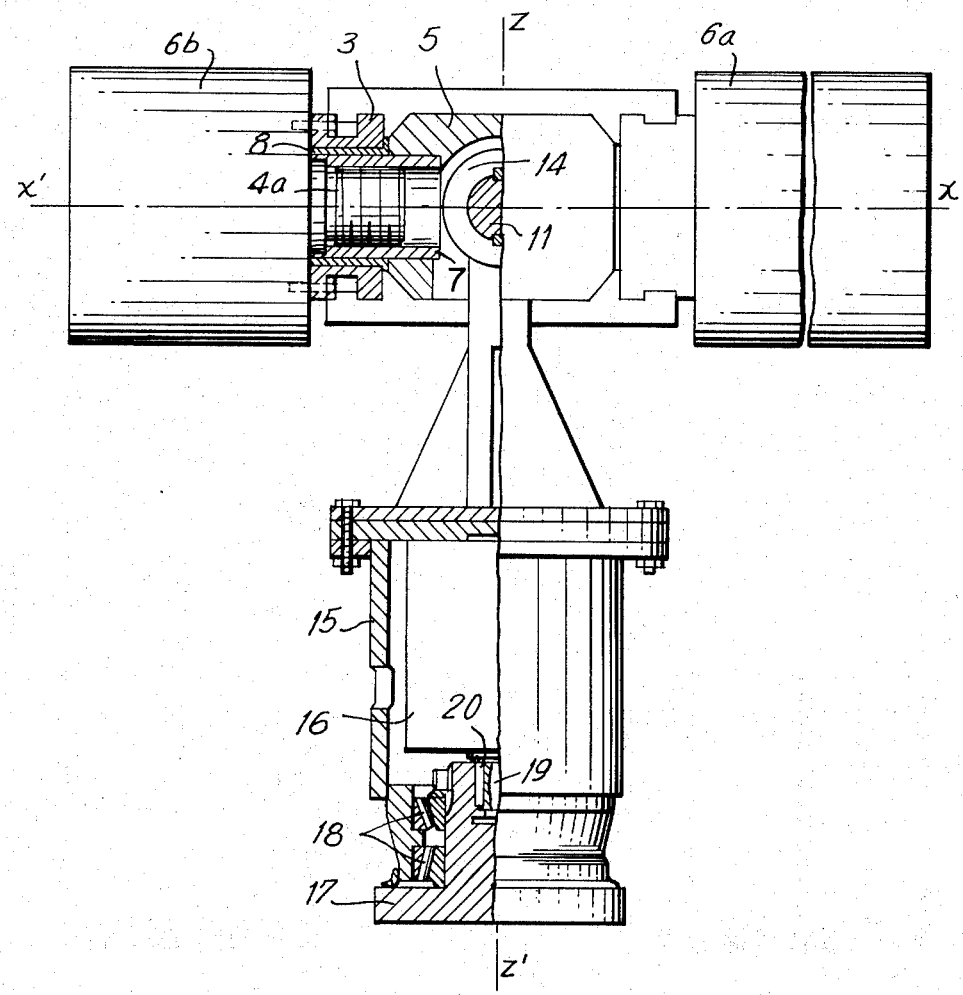
FIG. 3 is a semi-sectional view along line III—III of FIG. 2.

Bearing 2 is extended by a fork 3 having branches 3a, 3b forming a casing wherein rotate the two journals 4a of the sprocket 5 of a cardan joint lying between the two arms of the fork. On the outside of the fork and firmly connected therewith two hydraulic engines 6a and 6b are fitted. The left portion of FIG. 3 illustrates in section shaft journal 4a of engine 6b splined and fitted with the grooved collar 7 in one piece with sprocket 5 which rotates in bearing 8.

A hydraulic engine 9 is attached to the end of sprocket 5 opposite bearing 2. It is aligned on the y–y' axis perpendicular to the axis of shafts in journals 4a and 4b. The y–y' and x–x' axes are orthogonal axes of the cardan joint, located in a substantially horizontal plane in the case of FIG. 2.

The motor 9 comprises a splined journal 10 entering inside the sprocket 5. Into said journal 10, a journal 11 is telescoped able to rotate relatively to the sprocket 5 in the two bearings 12 and 13. On journal 11, an arm 14 is fitted; it is centered on the vertical axle Z–Z' and carries the appliance. Arm 14 pivots on the y–y' axis simultaneously with shaft 11 onto which it is keyed.

A casing 15 on the Z–Z' axis is attached to arm 14, said casing containing a hydraulic engine 16. The central bearing 17 of an appliance is suspended by means of a dual taper bearing at the lower end of casing 15.

Said central bearing is connected for rotation with a journal 19 of the motor 16, by means of a key 20. The appliance is, for example, a clamp.

The operation of the above apparatus is as follows:

To bring the appliance up to the load to be gripped, the hoisting gear operator includes arm 1 by pivoting it. The appliance bearing is free to pivot around the $x$–$x'$ axis and remains vertical.

To slew the appliance, the operator of the apparatus can make the appliance rotate around the $x$–$x'$ axis by acting on the two engines 6a and 6b. He can also control the rotation of the appliance around the $y$–$y'$ axis by means of engine 9. By acting on engine 16, the operator can slew the appliance making it pivot around axis $z$–$z'$.

The device described therefore allows its operator to slew the appliance concurrently in all directions by rotation around the three perpendicularly related axes $x$–$x'$, $y$–$y'$, $z$–$z'$.

Such means can be used to control the position of the appliance relative to the load at the instant of picking it up, or to control the slewing of the load while hoisting and before depositing it.

In certain applications, the load and the hoisting apparatus or else the hoisting apparatus and the bearing for taking the load are subject to motion relative to each other. This is the case, for example, when handling objects on open water. For example, the hoisting apparatus can be located on a wharf, potoon, floating platform or vessel relatively stable against the movements of waves, while the load to be handled is a load floating on the waves such as a fairly small boat which follows the movements of the swells.

In this case, when the floating load has already been hooked by the hoisting appliance and is still afloat, the appliance must be able to follow its movements and the device according to the invention allows this by virtue of the three degrees of freedom of the appliance around the three axes. However, the driver of the apparatus must also be able to steady the load as soon as it leaves the surface of the water. It is then sufficient for him to admit pressure progressively into the engines which then no longer act as motors but as damping brakes. By more or less closing, for example, an oil inlet valve, the driver can check the damping effect.

The device for the suspension of an appliance according to the invention is particularly suitable for the application just described for the raising of floating bodies. It is, however, specifically to be observed that the invention is not limited to that particular application. The device according to the invention can be applied whenever a coupling consisting of a universal joint is employed and when the rotations of the coupling are to be controllable either to promote them or to restrain them.

This device is applied particularly in all cases where an appliance is required to be attached to the arm of a lifting apparatus such as, for example, to the arm of a mechanical shovel, to the jib of a crane or to a derrick without using cable or hook while preserving full slewing freedom relative to the apparatus and having the means to control such slewing.

What is claimed is:

1. Coupling apparatus capable of controlled pivoting around three mutually perpendicular axes, said apparatus comprising:
    a cardan coupling having controllable movement about two of said three axes, said cardan coupling including a fork with two spaced branches, said fork being adapted for connection to a support, a sprocket supported in said fork for individual rotatable movement about said two axes, and at least one brake motor associated with each of said two axes for controllably moving the sprocket about a respective one of said two axes, the brake motor for controllably moving the sprocket about a first of said two axes being fixedly connected to said fork and including a journal rotatably mounted in said fork and coupled to said sprocket to rotate the same about said first axis, the brake motor for controllably moving the sprocket about the second of said two axes being fixedly connected to said fork and including a journal rotatably mounted in said fork and coupled to said sprocket to rotate the same about said second axis, said brake motors and their journals being axially aligned along their respective axes in prolongation thereof, and an arm suspended from said sprocket for movement therewith and a third brake motor supported from said arm and including a journal aligned with the third of said axes, and means for suspending an appliance from said journal of the third brake motor in driven relation from said third brake motor.

2. Coupling apparatus as claimed in claim 1 comprising a casing fixed to said arm and supporting said third brake motor therewithin.

3. Coupling apparatus as claimed in claim 2 wherein said means for suspending the appliance comprises bearing supports secured to said casing.

4. Coupling apparatus as claimed in claim 1 wherein said brake motors are hydraulic brakes.

5. Coupling apparatus as claimed in claim 1 wherein said brake motors extend externally of said sprocket and said fork.

* * * * *